Patented Feb. 4, 1930

1,746,168

UNITED STATES PATENT OFFICE

HUGH STOTT TAYLOR, OF PRINCETON, NEW JERSEY, ASSIGNOR TO E. I. DU PONT DE NEMOURS & COMPANY, OF WILMINGTON, DELAWARE, A CORPORATION OF DELAWARE

PHOTOCHEMICAL PROCESS

No Drawing.  Application filed May 28, 1928. Serial No. 281,353.

This invention relates to a process of polymerizing compounds, and specifically to a process of polymerizing polymerizable compounds by means of the resonance radiation of a metal.

Numerous compounds have been polymerized by various methods employing heat, advanced pressures and promoters or catalysts. Most of the processes are objectionable, however, in that they frequently require long periods of time in order to achieve the desired polymerization, or the process of polymerization may be attended with explosive possibilities which render the process dangerous. It is an object of my invention to polymerize compounds in a manner which is safe, easily controlled, and which does not require long periods of time. Other objects of my invention will appear to those skilled in the art, in subsequent parts of this specification.

My invention consists in its broad aspects in subjecting the compound, or compounds, which it is desired to polymerize to the resonance radiation of a given metal. Preferably, the substance to be treated is mixed or contacted with a metal vapor either as is or in the presence of the liquid or solid phase of the metal, and thereafter subjecting the contact mixture to the resonance radiation of that metal whose vapor is employed in the contact mixture.

If ethylene is placed in a quartz vessel containing mercury vapor in the presence of liquid mercury, and the system thereafter exposed to the light of a cooled mercury arc, at first an initial slight decomposition of the ethylene follows. Thereafter will follow the polymerization of the ethylene with the production of a heavy oily hydrocarbon of indefinite composition. The reaction proceeds rapidly at room temperature or temperatures even lower, and may be accelerated in a variety of ways. For example, the concentration of the mercury vapor may be increased; hydrogen may be added to the reaction system; the supply of resonance radiation may be increased by varying the intensity at the arc source; the temperature may be varied.

This invention differs fundamentally from a large number of other processes which are carried out photochemically in that the activating energy is not the whole region of ultra-violet light. Moreover, the energy is not absorbed directly by the compound being polymerized; in fact, the radiation is a very special fraction of the region of ultra-violet light, being the so-called resonance radiation of the metal whose vapor is employed in the contact mixture. My invention is not limited to the use of mercury and mercury vapors; other metals may be employed, in fact, any metal having an appreciable vapor tension at the pressure within the reaction chamber and known to respond to or absorb resonance radiation at such pressure. For example, cadmium can be and is quite successfully employed in carrying out my process, it being, however, desirable to carry the reaction at somewhat higher temperatures than with mercury (for example, in the polymerization of ethylene, around 250° C.), in order to secure an acceptable concentration of cadmium vapor.

In the case of mercury, the resonance radiation comprises that region near the center of the mercury line situated at a wave length close to 2536.7 Angstrom units. With cadmium a similar radiation is obtained in the region close to a wave length of 3262 Angstrom units. The resonance radiation energy, having access to the reaction system through the quartz vessel or other suitable container for the reaction system, is not directly absorbed by the reacting constituent but by the metal vapor which has deliberately been introduced for this purpose into the reaction system. The atoms of metal within the system after having absorbed the resonance radiation energy, are converted to an energy-rich or excited state. These excited atoms are capable of transferring this energy to the molecules of the polymerizable compound, probably by collision, thus activating said molecules for the polymerization process. The procedure may be described as a photosensitized polymerization of polymerizable compounds, the metal vapor being the sensitizing agent for the system, and the resonance radiation of the metal being the photoactive radiation.

The application of my invention is quite general, and is not confined to simple olefinic hydrocarbons of the ethylene series. My invention may be applied to a variety of olefinic compounds, such as those of the vinyl group as well as to diolefines and polyolefines of the di-vinyl and poly-vinyl series. By the use of my method the rapid polymerization of such technically important compounds as vinyl chloride, vinyl acetate, vinyl benzol, divinyl or butadiene, isoprene and dimethyl butadiene may be secured. There is thus opened up the rapid polymerization of such compounds with the attendant use of the polymers produced thereby, in film forming mixtures, or as resins, gums, or rubber-like articles. Organic compounds and hydrocarbons other than the ethylene series and other than the olefine and vinyl compounds may be treated by my process. For the purpose of simplicity I wish to embrace such compounds and their equivalents within the expression "polymerizable compounds".

I do not wish to place any restrictions of temperature, pressure, velocity of gas flow, composition of the gas mixture, concentration of metal vapor or intensity of incident radiation on the conduct of my process. These operating conditions may be varied within wide limits. In some cases such variations operate very advantageously to the conduction of the process. Thus, in the polymerization of ethylene the admixture of hydrogen to the ethylene undergoing polymerization causes an increase in the rate of polymerization which, over a moderate pressure range, is approximately proportional to the hydrogen concentration.

I have found that with my process the rate at which polymerization occurs is many times greater than the rate secured by exposure to sources of ultra-violet light of the same general intensity, which, however, do not contain the resonance radiation. I have found, also, that the operations can frequently be carried out in the presence of numerous foreign constituents which in other processes of polymerization would be highly detrimental, being catalyst poisons. There is thus opened up by my invention a range of gaseous mixtures containing polymerizable compounds which is considerably in excess of the range heretofore utilized.

As many apparently widely different embodiments of this invention may be made without departing from the spirit thereof, it is to be understood that I do not limit myself to the foregoing examples or description except as indicated in the following patent claims.

I claim:

1. The process of polymerizing polymerizable compounds which comprises subjecting said compounds to the resonance radiation of a metal.

2. The process of polymerizing polymerizable compounds which comprises subjecting said compounds to a metal vapor and to the resonance radiation of said metal.

3. The process of polymerizing polymerizable compounds which comprises placing a polymerizable compound in contact with a metal vapor and subjecting the contact mixture to the resonance radiation of the metal, the vapor of which is employed in the contact mixture.

4. The process of polymerizing olefinic compounds which comprises placing an olefinic compound in contact with a metal vapor and subjecting the contact mixture to the resonance radiation of the metal, the vapor of which is employed in the contact mixture.

5. The process of polymerizing olefinic compounds which comprises subjecting a mixture of olefinic compound and mercury vapor to the resonance radiation of mercury.

6. The process of polymerizing olefinic hydrocarbons which comprises placing an olefinic hydrocarbon in contact with a metal vapor and subjecting the contact mixture to the resonance radiation of the metal, the vapor of which is employed.

7. The process of polymerizing olefinic hydrocarbons which comprises subjecting a mixture of olefinic hydrocarbon and mercury vapor to the resonance radiation of mercury.

8. The process of polymerizing vinyl compounds which comprises placing a vinyl compound in contact with a metal vapor and subjecting the contact mixture to the resonance radiation of the metal, the vapor of which is employed.

9. The process of polymerizing vinyl compounds which comprises subjecting a mixture of vinyl compound and mercury vapor to the resonance radiation of mercury.

10. The process of polymerizing diolefines which comprises placing a diolefine in contact with a metal vapor and subjecting the contact mixture to the resonance radiation of the metal, the vapor of which is employed.

11. The process of polymerizing diolefines which comprises subjecting a mixture of diolefine and mercury vapor to the resonance radiation of mercury.

12. The process of polymerizing divinyl compounds which comprises placing a divinyl compound in contact with a metal vapor and subjecting the contact mixture to the resonance radiation of the metal, the vapor of which is employed.

13. The process of polymerizing divinyl compounds which comprises subjecting a mixture of divinyl compound and mercury vapor to the resonance radiation of mercury.

14. The process of polymerizing polyolefines which comprises placing a polyolefine in contact with a metal vapor and subjecting the contact mixture to the resonance radiation of the metal, the vapor of which is employed.

15. The process of polymerizing polyolefines which comprises subjecting a mixture of polyolefine and mercury vapor to the resonance radiation of mercury.

16. The process of polymerizing polyvinyl compounds which comprises placing a polyvinyl compound in contact with a metal vapor and subjecting the contact mixture to the resonance radiation of the metal, the vapor of which is employed.

17. The process of polymerizing polyvinyl compounds which comprises subjecting a mixture of polyvinyl compound and mercury vapor to the resonance radiation of mercury.

18. The process of producing polymerized resinous or gummy substances which comprises contacting the unpolymerized resinous or gummy base with a metal vapor and subjecting the contact mixture to the resonance radiation of the metal, the vapor of which is contacted with the base.

19. The process of producing polymerized rubber-like substances which comprises contacting the unpolymerized base with a metal vapor and subjecting the contact mixture to the resonance radiation of the metal whose vapor is contacted with the base.

In testimony whereof, I affix my signature.

HUGH STOTT TAYLOR.